United States Patent [19]

Bopp

[11] 4,351,426
[45] Sep. 28, 1982

[54] SINGLE STAGE CONTROL FOR VISCOUS FLUID COUPLING

[75] Inventor: Warren G. Bopp, Farmington Hills, Mich.

[73] Assignee: Eaton Corporation, Cleveland, Ohio

[21] Appl. No.: 220,929

[22] Filed: Dec. 29, 1980

[51] Int. Cl.$^3$ .............................. F16D 35/00; F16D 43/25
[52] U.S. Cl. .............................. 192/58 B; 123/41.12; 192/82 T
[58] Field of Search .................... 192/58 B, 82 T; 123/41.12

[56] References Cited

U.S. PATENT DOCUMENTS

| | | | |
|---|---|---|---|
| 2,658,400 | 11/1953 | Dodge | 74/230.17 |
| 2,974,768 | 3/1961 | Hause | 192/82 T |
| 3,559,786 | 2/1971 | Long, Jr. | 192/58 B |
| 3,968,866 | 7/1976 | Leichliter et al. | 192/58 B |
| 3,972,399 | 8/1976 | Bopp | 192/58 B |
| 4,056,178 | 11/1977 | Detty | 192/58 B |
| 4,064,980 | 12/1977 | Tinholt | 192/58 B |

Primary Examiner—Allan D. Herrmann
Attorney, Agent, or Firm—C. H. Grace; F. M. Sajovec

[57] ABSTRACT

A viscous fan clutch (10) is typically employed in a fan drive mechanism within a truck or automobile. A shaft (12) driven by the engine, rotates a clutch member (24) within the fan drive. The clutch member is arranged for fluid engagement with a cover assembly (38) for the transmission of torque thereto when the fluid is disposed in an operating chamber (70) defined by complementary shear surfaces (30, 31, 56, and 57) in the clutch and cover. During the relative rotation between the clutch and cover, fluid is pumped from the operating chamber to primary (76) and secondary (77) fluid storage chambers. A fluid temperature responsive control valve (190) provides for selective communication between the storage chambers and the operating chamber to effect modulation of the total fluid flow whereby quasi dual speed operation of the clutch is achieved. Upon receipt of a signal from a control circuit (146), a first measure of viscous fluid (from the primary storage chamber) flows rapidly into the operating chamber to effect a step speed increase. Subsequently, a second measure of viscous fluid (from the secondary storage chamber) flows slowly into the operating chamber to effect a second, gradual speed increase. In the preferred embodiment the valve operates in response to sensed engine liquid coolant temperature.

21 Claims, 3 Drawing Figures

SINGLE STAGE CONTROL FOR VISCOUS FLUID COUPLING

INTRODUCTION

The present invention relates to viscous fluid couplings, and more particularly to such couplings which transmit torque as a function of the temperature of an associated fluid. More particularly still, the present invention relates multispeed viscous fluid couplings which are employed as vehicle fan drives and which are actuated as a function of fluid temperature.

CROSS-REFERENCE

The subject matter of this invention is related to that of copending U.S. application Ser. No. 220,928, filed Dec. 29, 1980.

BACKGROUND OF THE INVENTION

Viscous fluid couplings have received wide acceptance in the automotive industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the engine coolant temperature rather than temperature of the air passing through the radiator. To date, many arrangements have been proposed to accomplish this result. Typically, these arrangements have made use of wet or dry plate clutches that are electrically actuated. In both of these arrangements, the advantages achieved through the use of viscous fluid have not been applied.

The need for a fan drive having more than one speed ratio is evidenced by U.S. Pat. No. 3,444,748, which illustrates a fan drive including a fluid coupling providing a high speed ratio (i.e. ratio of output or fan speed to input or engine speed) at low engine speed when relatively little air is being forced through the radiator due to movement of the vehicle, and an overrunning clutch for providing lower ratios at high engine speeds so that less horse power is being wasted driving the fan when higher vehicle speed is forcing a greater amount of air through the radiator. Reducing the speed ratio of the fan drive at higher engine speeds is also desirable to reduce the heat built up within the fan drive. However, such fan drives often include no provision for disengagement when the air temperature within the engine compartment is such that operation of the fan is unnecessary. Furthermore, such fan drives cannot be modified in an obvious manner to provide for purely temperature-responsive multispeed operation when a higher speed ratio at higher temperature is required.

Although temperature responsive multispeed viscous couplings have been proposed in the prior art, they have generally not been widely commercially successful due to their complexity, size and cost. One approach to dual speed operation has been to provide dual input members with associated mechanical drive mechanisms which are selectively engaged to drive the input shaft of the coupling at different speeds. Another prior art approach to multispeed operation has been through the restriction of fluid flow through a relatively large drain port by an overlaying valving element which is repositioned to provide, in effect, a variable orifice. Such approaches, although gaining some commercial acceptance, have proven to provide poor repeatability by being unable to precisely control the amount of viscous fluid in the operating chamber of the fluid coupling. Additionally, such devices typically repositioned their valve by the use of a single temperature sensing element which, although operating well about a single calibration point, was unable to provide reliable operation at two or more varying temperature set points or over a wide range of operation.

Prior art temperature responsive multispeed devices often display the attribute of "hunting", i.e. repeatedly shifting between speeds in a step fashion, and thereby generating undesirable abrupt engine load changes and subjectively annoying high noise levels. Additionally, many applications otherwise well suited for a simple "on-off" type device, require multispeed operation only during transitional operating modes such as short term cycling. Such applications have generally been filled by true multispeed prior art devices which are relatively complex and expensive.

It will be apparent from a reading of the specification that the present invention may be advantageously utilized with fluid couplings intended for many different applications. However, the invention is especially useful when applied to a viscous coupling or clutch which serves as a drive for a radiator cooling fan of a vehicle engine, and will be described in connection therewith.

BRIEF DESCRIPTION OF THE INVENTION

The present invention finds particular application in a viscous fluid clutch of the type including first and second members mounted for relative rotation about a common axis, cooperating shear surfaces disposed on the members and forming an operating chamber therebetween, viscous fluid storage means located near the operating chamber, and means operative to circulate viscous fluid between the chamber and operating means. According to the invention, and by way of overcoming the above described shortcomings of prior art viscous fluid clutches, the inventive viscous fluid clutch is provided with two distinct viscous fluid flow controls which selectively establish a relatively large flow rate and a relatively small flow rate, respectively, between the storage means and the operating chamber. This arrangement effects a time delayed or quasi multispeed operation of a viscous fluid clutch which is highly reliable, repeatable, mechanically simple and inexpensive.

The preferred embodiment of the invention finds particular application in a motor vehicle viscous fluid clutch of the type including a first clutch member fixed on a shaft for rotation therewith and a second clutch member supported by the shaft for rotation thereabout and having shear surfaces which coact with complimentary shear surfaces on the first member to define an operating chamber therebetween. First and second fluid storage chambers are located near the operating chamber, and a pump provides a circulating flow of viscous fluid between the chambers. According to the preferred embodiment of the invention, a valve operates to modulate flow of viscous fluid between the first storage chamber and the operating chamber as a function of a sensed fluid temperature (ambient air, engine coolant, etc.) and a separate flow control operates to selectively establish a predetermined substantially fixed flow rate of viscous fluid between the second storage chamber and the operating chamber. This arrangement has the advantage of providing temperature responsive quasi multispeed operation of a clutch employing a simple temperature sensing element having a single calibrated set point.

According to another aspect of the invention the first and second fluid storage chambers are serially interconnected with the operating chamber whereby the valve also operates to modulate the flow of viscous fluid from the second storage chamber to the operating chamber. This arrangement provides the advantage of simple clutch structure.

According to another aspect of the invention, a fluid return passageway empties into the first fluid storage chamber which, in turn, spills over into the second storage chamber. This arrangement has the advantage of assuring a preestablished measure of viscous fluid is contained within the first storage chamber immediately prior to opening of the valve.

According to still another aspect of the invention, the means for modulating the flow of viscous fluid includes a heating element, a control circuit operative to energize the heating element in response to the coolant temperature exceeding a predetermined value, a control pin and a bimetallic element operative to displace the pin in response to receiving heat from the element. This arrangement has the advantage of permitting the incorporation of the modulation means in a protected environment within the clutch to assure durability and integrity of operation.

Various other features and advantages of this invention will become apparent upon reading the following specification, which, along with the patent drawings, describes and discloses a preferred embodiment of the invention in detail.

The detailed description of the disclosed embodiment makes reference to the accompanying drawings.

DETAILED DESCRIPTION OF THE PREFERRED EMBODIMENT

Figure 1:
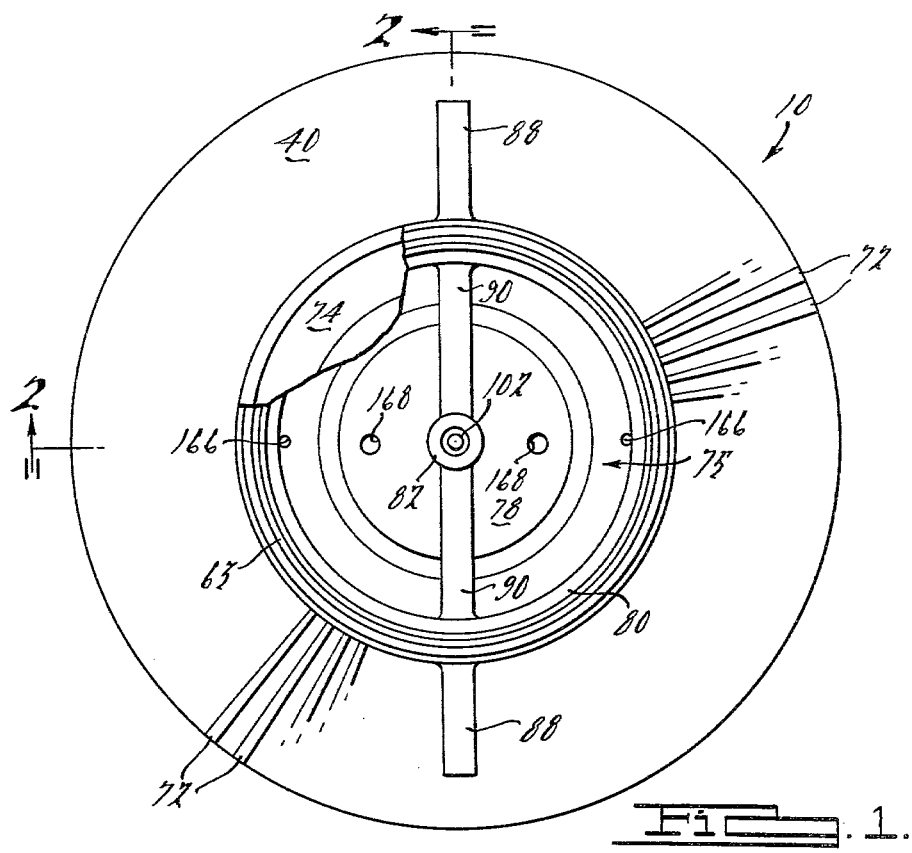
FIG. 1, is front plan view of the preferred embodiment of the invention with the front cover plate broken away.
Figure 2:
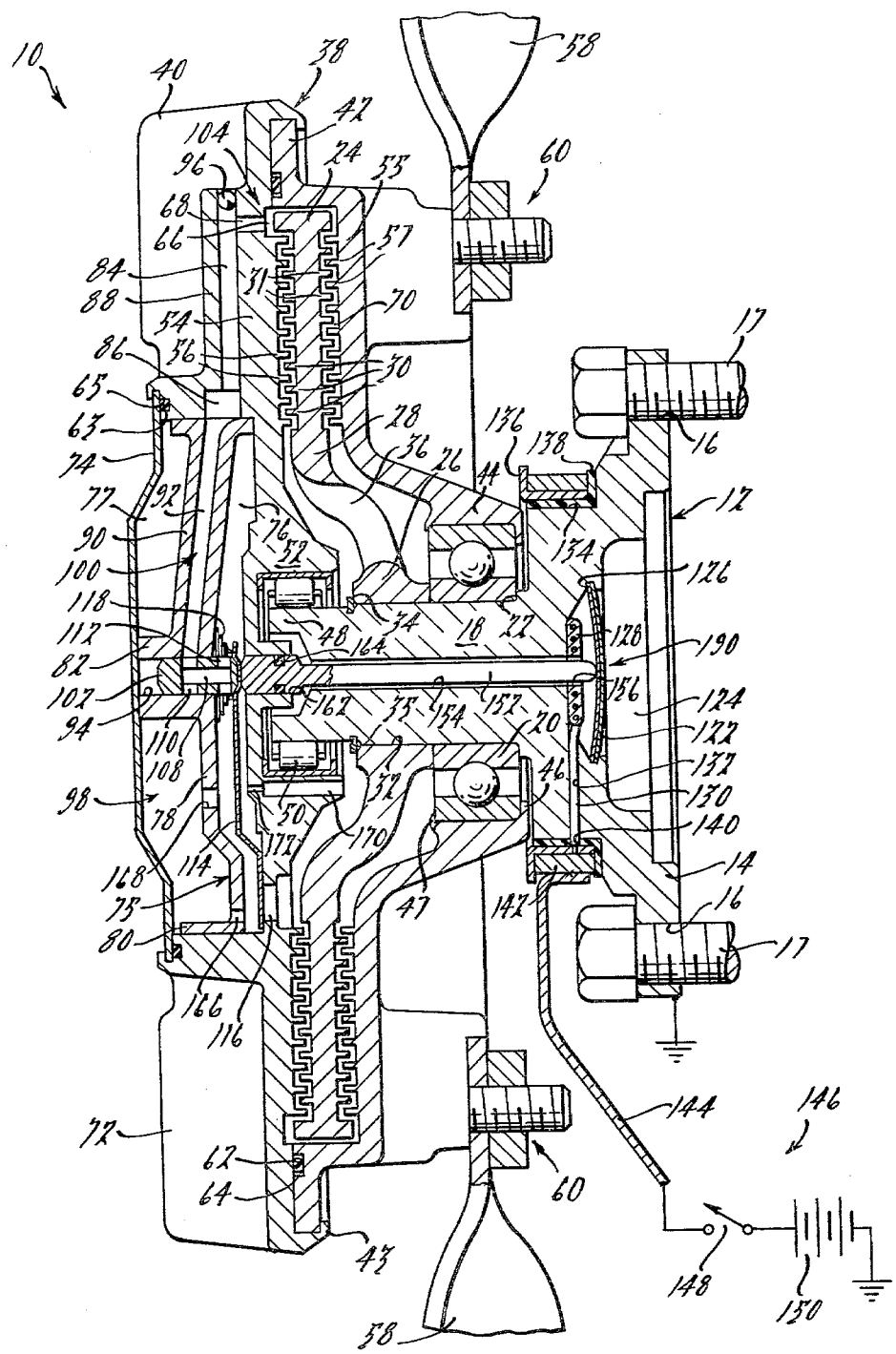
FIG. 2, is a cross-sectional view on an enlarged scale taken on line 2—2 of FIG. 1.

Referring to FIGS. 1 and 2, the preferred embodiment of a viscous fluid clutch 10 is illustrated. Clutch 10 comprises a driving or input shaft 12 including an integral shaft flange 14. Flange 14 defines a number of circumferentially spaced apertures 16 which accommodate bolts 17 for mounting clutch 10 to a driven shaft (not shown) such as that of an automobile engine coolant pump which is driven by a pulley and V-belt as is well known in the art. Driving shaft 12 is provided with a reduced intermediate portion 18 which functions as an inner race supporting surface for a ball bearing assembly 20. A shoulder 22 formed on shaft 12 restrains bearing 20 in one axial direction.

A clutch member 24 is provided with a hub portion 26 and a plate portion 28 having a plurality of concentric and annular coupling lands 30 formed on the front side thereof. Another plurality of concentric annular coupling lands 31 are formed on the back side of plate portion 28 of clutch member 24. Hub portion 26 is provided with a straight wall opening 32 which has an interference fit with reduced intermediate portion 18 of shaft 12 so that clutch member 24 rotates with and is axially retained on shaft 12. Hub portion 26 is pressed onto shaft portion 18 until it abuts the inner race of bearing 20 to confine bearing 20 in the other direction of axial movement. Clutch member 24 is further retained to shaft 12 by a retaining ring 34 disposed in a circumferential slot 35 within shaft 12. Several circumferentially spaced breathing apertures 36 are formed in clutch member 24 at the point of transition between hub portion 26 and plate portion 28.

A clutch cover assembly 38 comprising a cover member 40 and a body member 42 is mounted for rotation on shaft 12. Body 42 includes a hub 44 which is supported on the lateral surface of the outer race of bearing assembly 20 and is disposed in an interference fit therewith. Two shoulder portions 46 and 47 of hub 44 react against both end surfaces of the outer race of bearing assembly 20 and limit movement of body 42 in both axial directions.

The end of shaft 12 distal flange 14 terminates in a reduced end portion 48 which functions as an inner race supporting surface for a roller bearing assembly 50. Cover 40 includes a hub 52 and plate portion 54 having a plurality of concentric annular coupling lands 56 on the back side thereof. Likewise, body member 42 has a plate portion 55 having a plurality of concentric annular lands 57 on the front side thereof. Hub 52 is supported on the lateral surface of the outer race of bearing assembly 50 and is disposed in an interference fit therewith. Body 42 and cover 40 are thereby free to rotate about shaft 12 on bearing assemblies 20 and 50. Cover 40 is affixed to body 42 by means of a shoulder portion 43 which circumferentially embraces the radially outward most edge of body 42. Shoulder portion 43 is preferrably formed by swedging or otherwise locally deforming cover 40. A plurality of fan blades 58 are secured at the shank portion thereof by studs, nuts and lockwashers 60 at a radially intermediate portion of body 42. An elastomeric seal 62 resides in an annular channel 64 in the radially outward most portion of body 42 which abuts cover 40.

Cover 40 is provided with an annular recess 66 formed in the face thereof on the side adjacent lands 30. A pair of diametrically opposed axially directed holes 68 are disposed slightly radially outwardly of annular lands 56 within cover 40. Annular lands 56 and 30 as well as lands 31 and 57 and the adjoining grooved portions body 42 and cover 40 constitute shear surfaces and define an operating chamber generally designated 70 on both sides of plate portion 28 of clutch member 24, which operates such as described in U.S. Pat. No. 4,056,178, the specification of which is incorporated herein by reference. Annular lands 30 and 31 terminate or are alternately cut away in the form of a V-notch to form three equally spaced radially directed channels. The structure defines a known fluid path commencing with the area adjacent lands 30 and 56 as well as 31 and 57, the radial channels, axially directed holes 68 and annular recess 66.

Cooling fins 72 are integrally formed in cover 40 adjacent fan blades 58. Cooling fins 72 are arranged to provide additional cooling area and dissipate heat which is generated in clutch 10.

The radially innermost portion of the outside surface of cover 40 coacts with a cover plate 74 and a reservoir divider 75 to define a first or primary fluid storage chamber designated at 76 and a second or secondary fluid storage chamber designated at 77. The material of cover 40 proximate the peripheral edge of cover plate 74 is deformed to retain plate 74. An elastomeric seal 63 resides in an annular channel 65 in the leftward most surface of cover 40 (adjacently radially outwardly of chamber 77) which abuts cover plate 74.

Reservoir divider 75 is generally cylindrical in shape and has a central plate portion 78 integrally interconnecting a radially outward axially directed flange portion 80 and a central hub portion 82. Flange portion 80 extends circumferentially about reservoir divider 75, the radially outwardmost portion thereof set in an interference fit with a complimentarily shaped portion of cover member 40 for rotation therewith.

Two diametrically opposed radially directed return passage apertures 84 interconnect holes 68 with a divider interface cavity 86. Apertures 84 pass through associated areas of increased wall thickness 88 within cover 40. Reservoir divider 75 has two areas of increased wall thickness 90 which define two diametrically opposed radially directed return passage apertures 92 which are substantially in register with apertures 84, opening radially outwardly to cavity 86 and radially inwardly to an axially directed straight wall passageway 94 in hub portion 82 of reservoir divider 75. The radially outwardmost ends of return passage apertures 84 are sealed with interference fit balls 96 or other suitable material.

Hub portion 82 of reservoir divider 75 extends leftwardly (as viewed in FIG. 2), terminating in an abutting relationship with the inside surface of coverplate 74 which closes but does not seal the left hand opening of straight wall passageway 94. A valving element 102 is slidably disposed within passageway 94 and defines an axial bore 108 which is closed at both ends thereof and, depending upon the axial position of element 102 vis-a-vis hub portion 82, communicates with return passage apertures 92 through diametrically opposed radially directed ports 110 and with primary fluid storage chamber 76 through a second set of diametrically opposed radially directed ports 112 which are axially spaced from ports 110.

The right-hand most end of valving element 102 terminates within primary fluid storage chamber 76. An elongated valve blade 114 within primary fluid storage chamber 76 depends radially outwardly from the right-hand most end of valving element 102. The radially outward most end of valve blade 114 are illustrated as overlaying a pair of diametrically opposed relatively large drain ports 116 which would otherwise provide for fluid communication between primary fluid storage chamber 76 and operating chamber 70. A biasing spring 118 bears leftwardly against the right-hand most surface of reservoir divider 75 and rightwardly against the left-hand most surface of valve blade 114 adjacent its point of interconnection with valving element 102.

A bimetallic disc 122 is coaxially disposed within a recess 124 defined by flange 14 of driving shaft 12 and is supported thereby from displacement in one axial direction by a shoulder 126 formed in flange 14. The material forming flange 14 adjacent the circumferential edge of bimetallic disc 122 is swedged or otherwise deformed to prevent displacement of disc 122 in the other axial direction of travel. A ceramic heating element 128 is likewise disposed coaxially within recess 124 adjacent bimetallic disc 122. Heating element 128 operates to heat the surrounding area, including bimetallic disc 122 upon electrically excitation via a pair of insulated electrical leads. One lead 130 passes radially outwardly through a passageway 132 in flange 14, exiting the circumferential surface of still another reduced intermediate portion 134 of driving shaft 12. A steel race 136 is pressed over portion 134 for support thereon through an intermediate insulating gasket 138. Lead 130 passes through a registering aperture 140 in gasket 138 and is electrically connected to race 136. The remaining lead (not illustrated) is electrically connected to flange 14 and thus ground. Race 136 is thus mechanically supported by driving shaft 12 for rotation therewith but is electrically insulated therefrom. Race 136 and gasket 138 coact to support a bronze slip ring 142 from axial displacement while allowing it to rotate freely thereabout. Slip ring 142 is locally connected to an elongated tether 144 constructed of electrically conductive material. The other end of tether 144 is suitably connected to a control circuit shown generally at 146. In the preferred environment of a motor vehicle, tether 144 is insulatively connected to the vehicle's engine and electrically connected through a coolant temperature sensing switch 148 and source of voltage potential 150 to ground. Switch 148 is of the type which is mounted on the water jacket of the associated engine and has a heat-sensing probe or element immersed in the liquid coolant flowing therein.

A control pin 152 resides within an axially aligned bore 154 passing through driving shaft 12 as well as a registering aperture 156 in heating element 128. The right-hand most end of control pin 152 is blunted and abuts the central portion of bimetallic disc 122. The left-hand most end of control pin 152 passes through a registering aperture 162 within cover member 40 and terminates within primary fluid storage chamber 76. The left-hand most end of control pin 152 is tapered and abuts the right-hand most surface of valve blade 114 at the point which valve blade 114 is affixed to valving element 102. An O-ring 164 is provided in an appropriate recess within control pin 152.

A relatively small drain port or orifice 166 within reservoir divider 75 provides for fluid communication between the radially outward most portions of fluid storage chambers 76 and 77. Spill-over ports 168 are provided within reservoir divider 75 to provide selective communication between primary and secondary fluid storage chambers 76 and 77. In the preferred embodiment of the invention, diametrically opposed pairs of ports 166 and 168 are provided which are in rotational alignment generally with drain ports 116. A breathing aperture 170 passes through hub 52 to provide for air pressure equalization within clutch 10. The point at which breathing aperture 170 opens into primary fluid storage chamber 76 has an area of reduced diameter 172 which is dimensioned small enough to substantially exclude the entrance of viscous fluid while allowing the passage of air therethrough.

Control pin 152, bimetallic disc 122, heating element 128, valving element 102, valve blade 114 and spring 118 operate as a valve assembly indicated generally at 190. Valve assembly operates when pin 152 is axially displaced from a first position (illustrated) to a second position wherein control pin 152, valve blade 114 and valving element 102 are displaced leftwardly as viewed in FIG. 2 due to the snap action or over center operation of bimetallic disc 122. Bimetallic disc 104 is constructed employing known bimetal technology to assume its illustrated convex (as viewed from the right) configuration when subjected to an environment below a predetermined temperature level. When the temperature of the ambient air about bimetallic disc 122 exceeds the predetermined level, the bimetallic disc will, by over center or snap action assume a concave shape as viewed from the right in FIG. 2 and will so remain with increasing temperature. In transitioning from the first position to the second position, control pin 152, valve blade 114 and valving element 102 are displaced leftwardly. In the first position, valve blade 114 overlays drain ports 116 to preclude flow of viscous fluid from the primary fluid storage chamber 76 to operating chamber 70 and, simultaneously, establishes a fluid return passage comprising apertures 84 and 92 to return viscous fluid to primary fluid storage chamber 76 via ports 110, axial bore 108 and ports 112. In the second position, valve blade 114 is displaced leftwardly from its illustrated position, permitting viscous fluid within primary storage chamber 76 to flow through drain ports 116 under the influence of centrifugal forces into operating chamber 70. At the same time, the repositioning of valving element 102 closes off the return passageway where return passage apertures 92 open into passageway 94 due to axial misalignment of apertures 92 and ports 110.

Valve assembly 190 operates directly to modulate the flow of viscous fluid within primary fluid storage chamber 76 and indirectly to control the flow of viscous fluid within secondary fluid storage chamber 77. Valve assembly 190 operates as follows: switch 148 is calibrated to close when the liquid coolant within the engine associated with fan drive 10 exceeds a predetermined valve control temperature, thereby energizing heater 128. When heater 128 is not energized, bimetallic disc 122 assumes a concave orientation as viewed from the left in FIG. 2. When heater 128 is energized, disc 122 transforms through snap or over center action to assume a convex shape as viewed from the left thereby displacing control pin 152 leftwardly against the biasing effect of spring 118.

Presuming that the liquid coolant temperature in the associated engine has been below the predetermined valve control temperature ($T_S$) for some time, most of the viscous fluid will have been pumped to the fluid storage area or means designated generally at 98 (including fluid storage chambers 76 and 77) via a return passageway designated generally at 100 (comprising holes 68, return passage apertures 84, divider interface cavity 86, return passage apertures 92, ports 110, axial bore 108 and ports 112). The action of the pump generally designated at 104 returns viscous fluid to first fluid storage chamber 76 through return fluid passageway 100 during relative rotation between clutch member 24 and cover member 40 as is described hereinbelow. As fluid is discharged into first fluid storage chamber 76, it will accumulate therein until the surface level thereof is radially coextensive with spill over ports 168. At that time, viscous fluid will pour over into second fluid storage chamber 77 until the level of viscous fluid in both storage chambers equalizes and are mutually radially coextensive. While first fluid storage chamber 76 is being filled, a small amount of fluid will pass into second fluid storage chamber 77 through orifice 166. However, because the pumping capacity of pump 104 substantially exceeds the rate at which viscous fluid passes through orifice 166 under normal operation, most of the viscous fluid entering second fluid storage chamber 77 will do so through spill over ports 168. It is this feature, i.e. maintaining an exact fill of primary fluid storage chamber 76, regardless of the overall fill volume of the viscous fluid, that provides precise speed control. Restated, a precise, predetermined measure of viscous fluid is returned to primary chamber 76 before any fluid is returned to secondary chamber 77. This ensures consistent operation of clutch 10.

Thus, in the steady state "off" condition virtually all of the viscous fluid will be in the fluid storage means 98, a first predetermined measure of viscous fluid being contained in first fluid storage chamber 76 and a second predetermined measure of viscous fluid being contained in second fluid storage chamber 77.

Figure 3:
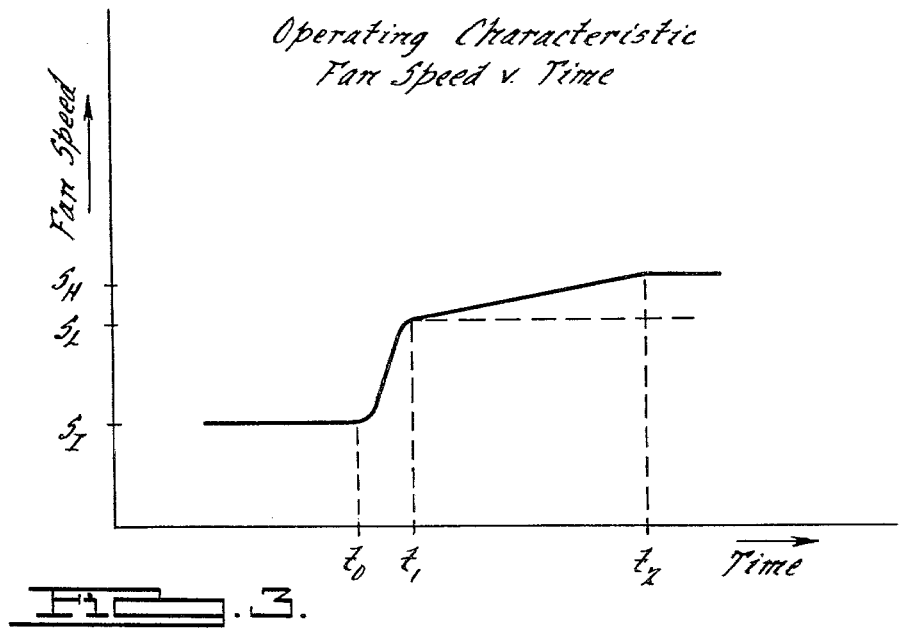
FIG. 3, is a graphical illustration of the fan speed versus time operating characteristic of the embodiment of FIG. 1.

The operation of clutch 10 can best be understood by referring to FIG. 3 wherein an operating characteristic of fan speed versus time is illustrated. When a sensed liquid coolant temperature is below $T_S$, most of the fluid will be in fluid storage means 98 and relatively little torque will be transmitted through clutch 10. Accordingly, the rotational speed of fan blades 58 will be relatively low or at an incipient (off) speed $S_I$. When the liquid coolant temperature equals $T_S$, switch 148 will close, causing valve assembly 190 to move to its second position whereby valve blade 114 uncovers drain ports 116. The first predetermined measure of viscous fluid (that contained in first fluid storage chamber 76) is then free to drain into operating chamber 70 relatively rapidly by virtue of the relatively large size of drain ports 116. If valve assembly 190 transitions from its first position to its second position at a referenced time (designated $T_0$), a relatively short time (until $T_1$) is required to bring the fan up to its low or primary engagement speed (designated $S_L$). $S_L$ is chosen to provide moderate cooling with low power consumption and little noise. Once the viscous fluid in first fluid storage chamber 76 has drained into operating chamber 70, the second measure of viscous fluid (that contained in fluid storage chamber 77) will then begin to slowly drain into operating chamber 70 through the radially outward most portion of first fluid storage chamber 76.

It should be noted that the serial arrangement of fluid storage chambers 76 and 77 (where viscous fluid within second fluid storage chamber 77 flows through first fluid storage chamber 76 on its way to operating chamber 70) is merely a convenient arrangement for a particular embodiment of the invention. As should be obvious to one of ordinary skill in the art in view of the present specification, second fluid storage chamber 77 could be reconfigured to directly drain into operating chamber 70 if provided with appropriate extension of valve assembly 190. Accordingly, in its broadest sense, the serial arrangement of the fluid storage chambers is not to be considered limiting.

Once the fluid within first fluid storage chamber 76 has been drained into operating chamber 70 and the fan blades 58 are rotating at their low speed $S_L$, fluid contained within second fluid storage chamber 77 continues to slowly drain into operating chamber 70 to cause a slow and controlled increase in speed of fan blades 58 towards a maximum high speed (designated $S_H$) after an extended period of time ($T_1$ to $T_2$). This time period is directly controlled by the sizing of orifice 166 which can readily varied depending upon the contemplated application. Restated, the "slope" of the characteristic between times $T_1$ and $T_2$ is determined by the size of orifice 166. Thus, with a single control signal from control circuit 146, quasi multispeed operation can be achieved wherein the fan speed is immediately increased from its incipient rate (that due to internal friction and the like) to a low speed $S_L$ in a step-like fashion, and then gradually increased to a high speed $S_H$ over an extended period of time. In effect, the present invention provides a time delay between fan drive 10 being turned on and its achieving maximum speed, thereby eliminating annoying high speed operation during the initial start up period of the associated vehicle. This is particularly adventageous in situations requiring short term cycling of viscous fluid clutch 10.

By way of an example which is not to be considered limiting, the applicant has found that sizing drain ports 116 and orifice 166 so that the time required to drain primary fluid storage chamber 76 ($T_0$-$T_1$) in nominally 5 seconds and secondary chamber 77 ($T_1$-$T_2$) in nominally 3 minutes, produces excellent primary engagement repeatability and overall clutch 10 performance in one particular test.

As recited earlier hereinabove, when valve assembly 190 in its second position, valving element 102 is displaced leftwardly and operates to close or choke off return passageway 100, preventing pump 104 from removing fluid from operating chamber 70. Thus, after time period $T_2$, virtually all of the viscous fluid will be contained in operating chamber 70. When the temperature of the liquid coolant sensed by switch 148 falls below $T_S$, switch 148 opens allowing heating element 128 to cool whereby bimetallic disc 122 will also cool and snap back to assume its illustrated first position. Biasing spring 118 will then displace control pin 152, valve blade 114 and valving element 102 rightwardly to a reassume their (illustrated) first position in which valve blade 114 agains overlays drain ports 116. Simultaneously, return passage 100 is then opened and pump 104 will rapidly displace the fluid within operating chamber 70 into storage chambers 76 and 77.

In operation, pumping action caused by the sweeping of the radially outward most portion of clutch member 24 by annular recess 66 causes a localized region of increased pressure within operating chamber 70. This pumping action is well known in the art and described in detail in U.S. Pat. No. 3,809,197, the specification of which is incorporated herein by reference. This increased pressure causes the viscous fluid in the operating chamber 70 to pass through holes 68 and into return passageway 100. The fluid will then pump radially inwardly therethrough and ultimately into first and second fluid storage chambers 76 and 77 respectively as was described hereinabove.

It is to be understood that the invention has been described with reference to a specific embodiment which provides the features and advantages previously described and that such specific embodiment is susceptible of modification as will be apparent to those skilled in the art. For example, second fluid storage chamber 77 could be valved and ported directly to operating chamber 77 rather than serially as is illustrated. Additionally, valve assembly 190 could be actuated electromagnetically or in response to the temperature of ambient air impinging upon a bimetallic element mounted on cover plate 74 as should now be obvious to one skilled in the art. Accordingly, the foregoing is not to be construed in a limiting sense.

What is claimed is:

1. A viscous fluid clutch comprising:
   first and second members mounted for relative rotation about a common axis;
   shear surfaces disposed on said first and second members and forming an operating chamber therebetween;
   fluid storage means disposed adjacent said operating chamber;
   means operative to generate a circulating flow of viscous fluid between said chamber and storage means;
   first flow control means operative to selectively establish a relatively large flow rate of said fluid between said storage means and said operating chamber; and
   second flow control means operative to selectively establish a relatively small flow rate of said fluid between said storage means and said operating chamber.

2. The viscous fluid clutch of claim 1, wherein said first flow control means comprises a valve operative to modulate said circulating flow as a function of a sensed fluid temperature.

3. The viscous fluid clutch of claim 2, wherein said sensed fluid comprises a liquid coolant of an engine associated with said clutch.

4. The viscous fluid clutch of claim 1, wherein said flow circulating means comprises a pump operative to displace viscous fluid from said operating chamber to said fluid storage means during relative rotation between said members.

5. The viscous fluid clutch of claim 2, wherein said second flow control means establishes said small flow rate as a function of said sensed fluid temperature.

6. A viscous fluid clutch comprising:
   first and second members mounted for relative rotation about a common axis;
   shear surfaces disposed on said first and second members and forming an operating chamber therebetween;
   first and second storage chambers adjacent said operating chamber;
   means operative to generate a circulating flow of viscous fluid between said chambers;
   valve means operative to modulate flow of viscous fluid between said first storage chamber and said operating chamber as a function of a sensed fluid temperature; and
   flow control means operative to selectively establish a predetermined substantially fixed flow rate of viscous fluid between said second storage chamber and said operating chamber.

7. The viscous fluid clutch of claim 6, wherein said valve means comprises a displaceable valving element operable to selectively cover a relatively large drain port interconnecting said first storage chamber and said operating chamber.

8. The viscous fluid clutch of claim 7, wherein said flow control means comprises a relatively small drain port interconnecting said second storage chamber with said operating chamber.

9. The viscous fluid clutch of claim 8, wherein said relatively small drain port comprises a calibrated orifice.

10. The viscous fluid clutch of claim 6, wherein said first and second storage chambers are serially interconnected with said operating chamber.

11. The viscous fluid clutch of claim 7, wherein said valve means further operates to modulate as a function of the position of said valving element.

12. The viscous fluid clutch of claim 6, wherein said flow circulating means comprises a pump operative to displace viscous fluid from said operating chamber to said storage chambers during relative rotation between said members.

13. The viscous fluid clutch of claim 6, wherein said sensed fluid comprises a liquid coolant of an engine associated with said clutch.

14. The viscous fluid clutch of claim 13, wherein said valve means comprises a heating element, a control circuit operative to energize said heating element in response to said coolant temperature exceeding a predetermined valve, a control pin and a bimetallic element operative to displace said control pin in response to receiving heat from said heating element.

15. A viscous fluid clutch comprising: a first member secured for rotation with a shaft;
a second member rotatably disposed on said shaft relative to said first member;
shear surfaces disposed on said first and second members and forming and operating chamber therebetween;
first and second fluid storage chambers serially adjacent said operating chamber;
pump means operative to circulate viscous fluid between said operating chamber and said storage chambers via a return passageway;
valve means operative to modulate the flow of viscous fluid within said return passageway and the flow of viscous fluid between said first storage chamber and said operating chamber as a function of a sensed fluid temperature; and
flow control means operative to selectively establish a predetermined substantially fixed flow rate of viscous fluid from said second storage chamber to said first storage chamber in response to operation of said valve means.

16. A viscous fluid clutch comprising:
a first member secured for rotation with a shaft;
a second member rotatably disposed on said shaft relative to said first member;
shear surfaces disposed on said first and second members and forming an operating chamber therebetween;
first and second fluid storage chambers radially inwardly serially adjacent said operating chamber;
pump means operative to circulate viscous fluid from said operating chamber to a substantially radially inwardly directed return passageway during relative rotation between said members;
valve means operative to modulate the flow of viscous fluid within said return passageway for selective discharge into said storage chambers and the flow of viscous fluid between said first storage chamber and said operating chamber through at least one relatively large interconnecting drain port at the radially outwardmost extent of said first storage chamber, as a function of a sensed fluid temperature; and
flow control means operative to selectively establish a predetermined substantially fixed flow rate of viscous fluid from said second storage chamber to said first storage chamber through at least one relatively small interconnecting drain port at the radially outwardmost extend thereof.

17. A viscous fluid clutch comprising:
first and second members mounted for relative rotation about a common axis;
shear surfaces disposed on said first and second members and forming an operating chamber therebetween;
at least one fluid storage chamber disposed adjacent said operating chamber;
means operative to generate a circulating flow of viscous fluid between said chambers;
means operative to modulate said flow in response to a control signal whereby a first predetermined measure of viscous fluid is delivered from said storage chamber to said operating chamber at a relatively rapid rate and subsequently, a second predetermined measure of viscous fluid is delivered from said fluid storage chamber at a relatively slow rate.

18. The viscous fluid clutch of claim 17, wherein said subsequently delivered predetermined measure of viscous fluid is delivered at a substantially constant rate.

19. The viscous fluid clutch of claims 6, 15 or 16 wherein said means operative to circulate said viscous fluid further operates to fill said first fluid storage chamber with a predetermined measure of viscous fluid prior to circulating viscous fluid to said second fluid storage chamber.

20. A method of controlling torque delivered by a viscous fluid clutch of the type including first and second members mounted for relative rotation about a common axis, shear surfaces disposed on said first and second members and forming an operating chamber therebetween, said first and second fluid storage chambers adjacent said operating chamber, said method comprising the steps of:
sensing the temperature of a fluid associated with said clutch;
circulating viscous fluid between said chambers;
selectively establishing a relatively large flow rate of said fluid between said first storage chamber and said operating chamber as a function of said sensed fluid temperature, whereby a predetermined measure of viscous fluid is rapidly delivered to said operating chamber; and
selectively establishing a relatively small flow rate of said fluid between said second storage chamber and said operating chamber, whereby a second predetermined measure of viscous fluid is slowly delivered to said operating chamber.

21. The method of claims 20 wherein said step of circulating viscous fluid comprises the substeps of:
circulating said predetermined measure of viscous fluid to said first storage chamber; and
subsequently, circulating said second predetermined measure of viscous fluid to said second storage chamber.

* * * * *